United States Patent
Ito et al.

(10) Patent No.: US 6,905,527 B2
(45) Date of Patent: Jun. 14, 2005

(54) METHOD OF MANUFACTURING CERIUM-BASED POLISHING AGENT

(75) Inventors: Terunori Ito, Tokyo (JP); Hiroyuki Watanabe, Tokyo (JP); Kazuya Ushiyama, Tokyo (JP); Shigeru Kuwabara, Tokyo (JP); Yoshitsugu Uchino, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 199 days.

(21) Appl. No.: 10/433,967

(22) PCT Filed: May 24, 2002

(86) PCT No.: PCT/JP02/05051

§ 371 (c)(1),
(2), (4) Date: Jun. 9, 2003

(87) PCT Pub. No.: WO02/097004

PCT Pub. Date: Dec. 5, 2002

(65) Prior Publication Data

US 2004/0219791 A1 Nov. 4, 2004

(30) Foreign Application Priority Data

May 29, 2001 (JP) ........................................ 2001-160644

(51) Int. Cl.[7] .............................. B24D 3/02; C09C 1/68; C09K 3/14
(52) U.S. Cl. .............................. 51/307; 51/308; 51/309
(58) Field of Search ...................... 51/307–309; 451/36, 451/41; 438/690–693

(56) References Cited

U.S. PATENT DOCUMENTS

| 5,759,917 | A | * | 6/1998 | Grover et al. ............... 438/690 |
| 6,221,118 | B1 | * | 4/2001 | Yoshida et al. ................ 51/309 |
| 6,428,392 | B1 | * | 8/2002 | Sunahara et al. ............. 451/36 |
| 6,689,692 | B1 | * | 2/2004 | Grover et al. ............... 438/691 |
| 6,783,434 | B1 | * | 8/2004 | Akahori et al. ............... 451/41 |
| 2003/0000150 | A1 | * | 1/2003 | Ito et al. ........................ 51/309 |
| 2004/0043613 | A1 | * | 3/2004 | Bessho et al. ............. 438/689 |

FOREIGN PATENT DOCUMENTS

| JP | 8-267355 A | 10/1996 |
| JP | 9-48615 A | 2/1997 |
| JP | 11-181404 A | 7/1999 |
| JP | 2001-35818 A | 2/2001 |

* cited by examiner

Primary Examiner—Duy-Vu N. Deo
(74) Attorney, Agent, or Firm—Rothwell, Figg, Ernst & Manbeck, P.C.

(57) ABSTRACT

This invention aims to provide a method of manufacturing a cerium-based abrasive containing coarse particles in lower concentration and having higher polishing ability and excellent cleanability for a polished face. Further, the present invention provides a method of manufacturing a cerium-based abrasive, including the steps of pulverizing a raw material, roasting a raw material after pulverization and disintegrating a raw material after roasting, in which a cerium-based rare earth carbonate or a mixture of a cerium-based rare earth carbonate and a cerium-based rare earth oxide is used as a cerium-based abrasive raw material, and the step of pulverizing a raw material pulverizes a raw material through heating while the material is kept immersed in aqueous solution.

5 Claims, No Drawings

METHOD OF MANUFACTURING CERIUM-BASED POLISHING AGENT

TECHNICAL FIELD

The present invention relates to a method of manufacturing a cerium-based abrasive and more particularly to that method of manufacturing a cerium-based abrasive which features a step of pulverizing a raw material before roasting, and also to a cerium-based abrasive manufactured by the method thereof.

BACKGROUND ART

Cerium-based abrasives (hereinafter simply called abrasives) have frequently been used to polish optical lenses conventionally. Recently, they have also widely been used as abrasives for glass materials used in electric and electronic apparatuses, including glass for magnetic recording media such as hard disks and glass substrates of liquid crystal displays (LCD's).

Cerium-based abrasives are manufactured from, for example, cerium-based rare earth carbonates (hereinafter also called rare earth carbonates) obtained from bastnasite ores or complex ores produced in China, or cerium-based rare earth oxides (hereinafter also called rare earth oxides) obtained by calcining rare earth carbonates at high temperature in advance as follows. First, these raw materials for cerium-based abrasives (hereinafter simply called raw materials) are wet pulverized by a pulverizing apparatus such as an attriter, a ball mill or a bead mill, and then are subjected to chemical treatment (wet treatment), followed by filtration and drying. After that, roast by heating appropriately sinters the particles of the raw materials to each other. The raw material after sintering is dry or wet disintegrated (re-pulverized) using such a pulverizing apparatus as described above and then the raw material after disintegration is classified. Such treatment provides an abrasive with desired particle diameters and a particle size distribution. In addition, the chemical treatment in this case refers to the treatment (treatment by mineral acids) of removing alkaline metals such as sodium, which give rise to abnormal particle growth during roasting, and to the treatment (fluorination) of adding a fluorine component for the purpose of attaining the polishing ability of a cerium-based abrasive and attaining the smoothness of a face to be polished. A fluorine component reacts with glass, i.e. a material to be polished, to enhance the smoothness of a face to be polished and the polishing ability. Therefore, fluorination can offer such effects.

Incidentally, abrasive products should not contain coarse particles. This is because coarse particles scratch a face to be polished. In addition, for example, a polishing step conducted in a manufacturing step for a glass substrate used for a magnetic recording medium capable of high density recording and high speed reading and writing requires a very high degree of precision in the smoothness and the like of the surface (face to be polished) of a glass substrate. Although these demands need to be satisfied, a high concentration of coarse particles in an abrasive is liable to generate scratches on the surface of a glass substrate; as a result, requirements such as smoothness cannot be attained. Accordingly, in this respect, it is desirable that an abrasive should not contain coarse particles.

Furthermore, taking into account polishing operation efficiency in a polishing step, an abrasive product needs a high polishing ability. Thus, in order to attain a high polishing ability, an abrasive needs to be pulverized so that the particle diameter is not lowered more than necessary.

Incidentally, conventional pulverizing means has some limit, so that it cannot satisfy these requirements. That is, reduction of the number of coarse particles by conventional wet pulverization using pulverizing apparatuses such as a ball mill, an attriter and a bead mill requires elongated pulverizing duration, which in turn increases the amount of fine particles pulverized more than necessary, leading to the difficulty of attaining a polishing ability of the abrasive product.

Hence, conventional abrasives achieve the smoothness required for a face to be polished and polishing ability during polishing by adding a fluorine component by fluorination during abrasive production to utilize the effect of the fluorine component added. As described above, this is due to the fact that a fluorine component has the effects of enhancing the smoothness of a face to be polished and of enhancing polishing ability. For example, a method is disclosed in Japanese Patent Laid-Open No. 9-183966, in which an abrasive is manufactured by dropping hydrofluoric acid aqueous solution, with agitation, into raw material slurry after wet pulverization so as to make the content of fluorine in an abrasive product become 3% by weight to 9% by weight.

However, attainment of required smoothness and polishing ability by the addition of fluorine increases the concentration of the fluorine component in the abrasive, thereby easily adhering the fine particles of the abrasive to a face to be polished during polishing and also easily causing the particles to remain on the face polished, leading to the disadvantage of lowering cleanability for the face polished.

The present invention has been made in the background described above and offers a subject to provide a method of manufacturing a cerium-based abrasive having coarse particles in lower concentration and having higher polishing ability and also having excellent cleanability for a polished face.

DISCLOSURE OF THE INVENTION

In order to solve this subject, the inventors investigated pulverizing conditions of further decreasing the concentration of coarse particles and of further decreasing the concentration of fine abrasive particles, focusing on the step of pulverizing a raw material in early stages of abrasive production conventionally carried out by using pulverizing apparatuses such as an attriter. However, the inventors were unsuccessful in finding pulverizing conditions under which the concentrations of both coarse particles and fine abrasive particles can be further lowered.

Therefore, the inventors widely studied pulverizing means without adhering to conventional pulverizing methods. As a consequence, the inventors have found out that a raw material can be pulverized by heating while the material is kept immersed in aqueous solution when the material is special even though it is not pulverized using pulverizing apparatuses such as an attriter, and have arrived at this invention.

In other words, the present invention is a method of manufacturing a cerium-based abrasive, having a step of pulverizing a raw material of a cerium-based abrasive and also having a step of roasting a raw material after pulverization and a step of disintegrating a raw material after roasting, characterized in that a cerium-based rare earth carbonate or a material containing both a cerium-based rare earth carbonate and a cerium-based rare earth oxide is utilized as a raw material of a cerium-based abrasive, and in that the raw material is pulverized by heating while the material is kept immersed in aqueous solution in the pulverizing step.

In the pulverizing step, a cerium-based rare earth carbonate or a material containing both a cerium-based rare earth carbonate and a cerium-based rare earth oxide is utilized as a raw material and this raw material is pulverized by heating while the material is kept immersed in aqueous solution (hereinafter also called immersion heating pulverization). The size of a raw material prior to immersion heating pulverization is not strictly limited; however, a raw material is usually used after the material is coarsely pulverized until the average particle diameter becomes 1,000 $\mu$m or less, and this level of the size is preferable. When the average particle diameter exceeds 1,000 $\mu$m, the particle is preferably ground by a grinder until the average particle diameter becomes 1,000 $\mu$m or less before the particle is subjected to immersion heating pulverization. In addition, a raw material to be immersed in aqueous solution may be a dried powder or slurry.

A mixing ratio (ratio by weight) of raw material to aqueous solution is not particularly limited; however, the weight of aqueous solution is preferably 0.5 to 10 times that of a raw material (solid component when the raw material is slurry). This is because when the amount of aqueous solution is less than half that of a raw material, the raw material cannot uniformly be heated in some cases, while the uniformity of heating is not improved even when the amount of aqueous solution is more than 10 times, leading to wastes of heating time and energy. In addition, aqueous solution used to immerse a raw material is water itself (pure water, industrial water, tap water, or the like) and also includes solutions with which water-soluble organic solvents such as alcohol and acetone are mixed. This is because that these solutions allow a raw material to be subjected to immersion heating pulverization.

Aspects of heating while a raw material is kept immersed in aqueous solution include an aspect in which a raw material is immersed in aqueous solution before heated and then the resultant solution is heated, an aspect in which a raw material is immersed in heated aqueous solution, and an aspect in which a raw material is immersed in heated aqueous solution and then further heated. In addition, a raw material is preferably dispersed in aqueous solution by agitation during immersion heating pulverization so as to uniformly heat the raw material.

When a raw material is pulverized in such a way, the raw material (solid component in slurry) can be pulverized without using a conventional pulverizing apparatus that physically pulverizes a raw material, including an attriter, a ball mill or a bead mill, and further the method can totally pulverize a raw material more uniformly than conventional pulverizing methods. Additionally, such a conventional pulverizing method pulverizes a raw material by forcibly moving pulverizing media such as balls, or the like and colliding the pulverizing media with each other, which is liable to form pulverized and un-pulverized raw materials. As a result, some part of a raw material remains as coarse particles due to a lack of pulverization; on the other hand, some part is likely to become fine particles due to excessive pulverization.

The reason why immersion heating pulverization is possible is that when a raw material is heated in aqueous solution, some part of carbonate in the raw material appears to decompose to release carbon dioxide, thereby causing the pulverization to proceed. For example, analysis of a rare earth carbonate after immersion heating pulverization by an x-ray diffraction apparatus reveals that the monoxycarbonate attributes to the main peak. In addition, immersion heating pulverization can totally heat a raw material uniformly and reliably through the medium of aqueous solution and thus seems to be capable of totally pulverizing a raw material uniformly. Further, a method of heating a raw material at a high humidity was considered instead of immersion heating; however, the heat conduction is not uniform compared to the case of immersion heating, thereby leading to less uniformity of pulverization and to remaining of relatively coarse particles. Additionally, the method needs heating for a long while for pulverization in an extent similar to that of immersion heating pulverization and therefore causes problems of decreasing productivity and possibly lowering the polishing speed as well. Furthermore, accomplishing the heating at a high humidity requires an expensive apparatus such as a thermo-hygrostat or a dryer capable of introducing steam. That is, aqueous solution is excellent as a heating medium for uniformly heating a raw material as compared with steam.

If a raw material is totally pulverized uniformly, remaining of coarse particles is prevented, and partially excessive pulverization is prevented, and the formation of fine particles are also prevented. In other words, immersion heating pulverization has the effects of decreasing the concentrations of both coarse particles and fine particles in a raw material. If the concentration of coarse particles in a raw material after pulverization can be decreased, the concentration of coarse particles in an abrasive product can be decreased more reliably and more easily. If the concentration of coarse particles in an abrasive is lowered, the formation of scratches on a face to be polished, due to coarse particles, is more reliably prevented. In addition, if the concentration of fine particles in a raw material after pulverization can be lowered, the particle diameter of each abrasive particle constituting an abrasive consequently becomes near the average particle diameter, thereby increasing the polishing speed.

If a necessary polishing speed is attained, the concentration of a fluorine component in an abrasive product can be reduced since attaining these performances by addition of a fluorine component is not required, and so the cleanability for a polished face can be enhanced by lowering the concentration of a fluorine component. Of course, if necessary performances such as cleanability are attained, a small amount of fluorine component can be added within an allowable level to thereby, for example, increase the polishing speed. Further, higher levels of environmental measures have recently been required year by year, and therefore the reduction of the concentration of a fluorine component is thought to be required. If the concentration of a fluorine component can further be decreased, the demand can be better satisfied.

In the step of pulverizing a raw material, immersion heating pulverization can be carried out along with the pulverization by means of conventional pulverizing apparatuses such as an attriter, a ball mill and a bead mill. Thus, the combination can more effectively perform pulverization in some cases. When another pulverizing method is used in combination, immersion heating pulverization may be carried out before, after or concurrently with pulverization by the method.

In addition, the investigation of immersion heating pulverization discovered that the state of pulverization varies depending on heating temperature. Thus, the inventors studied heating temperature. As a result, it was found out that in the pulverizing step by heating while a raw material is kept immersed in aqueous solution, the temperature of heating the aqueous solution is preferably 60° C. or higher. This is because pulverization does not sometimes proceed sufficiently at lower than 60° C. On the other hand, the inventors failed to find the upper limit of the heating temperature. This is because the boiling point of an aqueous solution in which a raw material is immersed is about 100° C. at normal pressure and heating at a higher temperature needs a special apparatus such as an autoclave, that is, it is industrially disadvantageous, and so the inventors did not conduct the experiment. However, the temperature of at least 100° C. or lower can be used to pulverize a raw material.

Further, pulverizing duration for immersion heating pulverization was also studied. As a result, in as extremely short a time as 1 minute, immersion heating pulverization was found to pulverize a raw material. In other words, immersion beating pulverization can not only pulverize a raw material uniformly, but also rapidly pulverize a raw material in a short time. However, as the pulverizing duration is elongated, the formation of fine particles caused by excessive pulverization increases the concentration thereof, and thus pulverizing duration is preferably shorter than 90 minutes. Further, to permit the excellent pulverization of decreasing the concentrations of both coarse particles and fine particles, the pulverizing duration is more preferably 60 minutes or shorter.

In addition, as described above, the present invention utilizes as a raw material a cerium-based rare earth carbonate or a material containing both a cerium-based rare earth carbonate and a cerium-based rare earth oxide. Immersion heating pulverization can pulverize a raw material so as to cause the residual amount of coarse particles and the amount of fine particles generated to be minimized. This seems to be mainly due to its effect on the rare earth carbonate.

Furthermore, "cerium-based rare earth species" refer to materials in which the percentage of the amount of cerium oxide ($CeO_2$) in the total amount of rare earth oxides in the total weight (hereinafter called TREO) is 30% or more by weight. In normal abrasive production, a material in which the percentage ranges from 40% by weight to 99% by weight is utilized. Additionally, a "cerium-based rare earth carbonate" is a material that is obtained using a precipitant containing a carbonate from a "cerium-based rare earth" aqueous solution. For example, cerium-based rare earth aqueous solutions include a rare earth chloride aqueous solution and precipitants include ammonium hydrogencarbonate. In addition, a "cerium-based rare earth oxide" is a material made by roasting a cerium-based rare earth carbonate for oxidation.

Now, a preferable range as a raw material utilized in a method of manufacturing a cerium-based abrasive of the present invention was studied, focusing on the physical property of loss on ignition (hereinafter also called LOI) for a raw material used for a cerium-based abrasive. LOI refers to a weight loss rate when a target material is strongly heated. This value is about 30% by weight to 40% by weight for rare earth carbonates; it is 0% by weight for a completely oxidized rare earth oxide. LOI indicates the proportion of a rare earth carbonate, which is highly chemically pulverized, in a raw material.

Studies on raw materials containing both a cerium-based rare earth carbonate and a cerium-based rare earth oxide showed that a raw material used for a cerium-based abrasive, having a value of loss on ignition of 1.0% by weight to 40% by weight when the raw material was heated at 1,000° C. for 1 hour, is preferable. As the value of LOI becomes smaller than 1.0% by weight, that is, the percentage of a rare earth carbonate is decreased, the effect of pulverizing coarse particles appears to be rarely obtainable during pulverization. In addition, a material with LOI of less than 0.5% by weight is referred to as a rare earth oxide.

The measurement of LOI of raw materials was carried out in accordance with JIS-K0067 (1992, Japanese Standards Association). The measurement procedure will be simply described as follows. First, a small amount of raw material was sampled and it was preliminarily dried at 105° C. sufficiently until no decrease in the amount was observed (for example, for 1 hour). After preliminary drying, in a crucible with a predetermined weight (A g (grams)) was placed the dried raw material and then the whole weight (B g) was measured to 0.1 mg to evaluate the weight W1 (=B−A) of the raw material. Then, the crucible was heated in an electric furnace at 1,000° C. for 1 hour and then was allowed to cool in a dry atmosphere. Again, the weight (C g) of the crucible containing the raw material was measured and the difference W2 (=B−C) of the weights before and after the heating was calculated. On the basis of this value, LOI (=(W2/W1)×100, unit: % by weight) was evaluated. In addition, the reason why preliminary drying is carried out in the LOI measurement is that a normal raw material contains moisture in many cases and the measurement of LOI, with moisture contained, cannot provide a useful index that indicates the exact percentage of rare earth carbonates in a raw material. Further, setting of the preliminary drying temperature to be 105° C. is based on JIS-K-0068 (1992), "A Method of Measuring Moisture in Chemical Products," "5. Drying Weight Reduction Method," which specifies that a sample shall be heated for drying at 105° C. until the weight reaches a constant value. Furthermore, the reason why the weight was measured after a material was heated at 1,000° C. for 1 hour is that for rare earth carbonates, it is experimentally confirmed that the value of loss on ignition starts to stabilize by heating at 500° C. or higher, and the index obtained at 1,000° C. is considered to be the most stably applicable.

Incidentally, a raw material containing both a cerium-based rare earth carbonate and a cerium-based rare earth oxide is roughly classified into a raw material (former) obtained by calcining a cerium-based rare earth carbonate and a raw material (latter) obtained by mixing a cerium-based rare earth carbonate and a cerium-based rare earth oxide. The former raw material is more excellent in pulverability, and so the concentration of coarse particles in the obtained abrasive product is lower and the raw material is more preferable. The former raw material is obtained by appropriately calcining the whole of a rare earth carbonate raw material and immersion heating pulverization is considered to uniformly proceed in the whole raw material due to the fact that the carbonate is uniformly contained in the whole raw material even from a relatively microscopic viewpoint. On the other hand, the latter raw material is a mixture of particles of rare earth carbonates easy to be pulverized and particles of rare earth oxides hard to be pulverized due to no carbonates contained, and thus it is considered hard to be pulverized uniformly and coarse particles tend to remain.

After completion of the step of pulverizing a raw material, a step similar to a normal manufacturing step as described in the prior art is carried out to manufacture an abrasive. More specifically, firstly, a material is subjected to a chemical treatment (wet treatment) as necessary, followed by filtration and drying. Then, the material is roasted to be disintegrated (re-pulverized). When the material is disintegrated through wet pulverization, decreasing the number of coarse particles through sufficient disintegration provides an abrasive of a slurry state at the time of completion and further drying the resultant material gives a powder-like abrasive. In some cases, after disintegration, the number of the coarse particles and/or fine particles is decreased through wet classification, or the number of coarse particles is passed through a cartridge filter to be decreased, or a similar operation is carried out, to further provide an abrasive of high quality. On the other hand, when disintegration is carried out through dry pulverization, after disintegration, dry classification is normally conducted to obtain a powdered abrasive with a desired particle diameter and a particle size distribution. In this case, to obtain an abrasive of a slurry state, a dry-classified, powdered abrasive may be made slurry, or an abrasive after disintegration through dry pulverization may be made slurry, and then the slurry is subjected to wet classification. Further, the chemical treatment in this case refers to fluorination or treatment by mineral acid, and as can be seen from the descriptions thus far, a method of manufacturing a cerium-based abrasive according to the present invention does not necessarily require fluorination, and therefore a large reduction of the amount of fluorine component added by fluorination and further the reduction to the zero (0) content are possible.

As has been described thus far, the method of manufacturing an abrasive of the present invention can pulverize a raw material in such a way that the concentrations of both coarse particles and fine particles are decreased, and thus an abrasive with coarse particles and fine particles both in low concentrations can be easily manufactured. That is, a conventional manufacturing method cannot pulverize a raw material so as to lower both the concentrations, and so, conventionally, a raw material is, at first, pulverized to lower the concentration of coarse particles and a necessary polishing ability (polishing speed) is obtained by the addition of a fluorine component. Therefore, it is difficult to manufacture an abrasive with coarse particles and fluorine both in low concentrations. On the other hand, a method of manufacturing a cerium-based abrasive according to the present invention can easily produce an abrasive excellent in polishing speed, smoothness for a face to be polished and cleanability, even though the fluorine content in an abrasive is greatly decreased compared with the conventional case, or no fluorine is added. As a result of investigation, of abrasives produced through a method of manufacturing a cerium-based abrasive according to the present invention, an abrasive having a fluorine component in a concentration of 3.0% or less by weight has been found to be a one excellent in smoothness and cleanability for a polished face, as well as polishing ability, which rarely makes scratches during polishing. This is because the cleanability is rapidly decreased when the concentration of a fluorine component in an abrasive exceeds 3.0% by weight. Further, an abrasive having a fluorine component in a concentration of 0.01% by weight to 1.0% by weight has been found to be particularly excellent in cleanability.

BEST MODE FOR CARRYING OUT THE INVENTION

Best modes for carrying out the present invention will be described in the following.

First Embodiment:

A rare earth carbonate having 12% by weight of loss on drying, containing 69% by weight of TREO with respect to the weight of a dried material, 60% by weight of cerium oxide ($CeO_2$) in TREO and 0.1% by weight of a fluorine component with respect to TREO was used as the cerium-based abrasive raw material. In addition, the average particle diameter of the raw material was about 500 $\mu$m and the LOI of the raw material was 30% by weight. A method of measuring LOI was described above, and thus its description is omitted. Each Embodiment or Comparative Example as described later utilized this raw material, unless otherwise mentioned.

First, 9.3 kg of pure water was put in the container of a agitating apparatus and was heated to 65° C., and then to this was charged 5.7 kg of the raw material (of it, water is 0.7 kg) with agitation for 5 minutes. Further, means for heating the water in the container was placed in the agitating apparatus and the slurry in the container was heated from the start time of charging the raw material until the completion of agitation so that the temperature of the slurry in the agitating apparatus was kept at 60° C. or higher (65° C. or lower (=the lower limit temperature+5° C. or lower)). After the completion of agitation, the slurry (the content of solid component of 33.3% by weight) composed of water and the raw material in the agitating apparatus was charged into an attriter having 10 kg of balls 4 mm in diameter (MA-1SE, manufactured by Mitsui Miike Machinery Co., Ltd.) and then was wet pulverized for 1 hour. After pulverization, the solid component was filtered to obtain cake, which was dried and roasted (850° C., 5 hours) and then was disintegrated with a sample mill (manufactured by Fuji Paudal Co., Ltd.). In order to decrease the number of coarse particles, the material thus obtained was classified once (classifying point: 7 $\mu$m) using a turboplex (manufactured by Hosokawa Micron Corporation), a type of a wind classifying apparatus, to thereby obtain a cerium-based abrasive product. Then, the cerium-based abrasive thus obtained was subjected to the measurement of the particle size distribution via a particle size analyzer (Micro-track MK-II SPA MODEL 7997-20, manufactured by Nikkiso Co., Ltd.) and then the value of the particle diameter (average particle diameter (D50)) was evaluated so that the volume accumulated particle size distribution frequency from the small particle diameter side became 50%.

Measurement of the Concentration of Coarse Particles:

In the Embodiments and Comparative Examples as described later, including the First Embodiment, the concentrations of coarse particles (the concentration of particles with a diameter of 10 $\mu$m or more) of the raw material and abrasive products were measured in the specified time of the pulverizing step (see Table 1) and the concentrations of coarse particles for the obtained abrasives were also measured. The concentration of coarse particles was measured in the following way. A target to be measured was sampled and measured so that the weight of the solid component of the target was 200 g, and the sample was dispersed in an aqueous solution containing 0.1% by weight of sodium hexametaphosphate as a dispersant with agitation for 2 minutes to thereby produce slurry. This slurry was filtered using a microsieve with a pore diameter of 10 $\mu$m and then the residue on the sieve was collected. The residue thus collected was again dispersed in a solution with 0.1% by weight of sodium hexametaphosphate to be made slurry. In this case, dispersion was carried out by means of ultrasonic agitation for 1 minute. Then, the slurry was filtered using a microsieve with a pore diameter of 10 $\mu$m. The residue collected was made slurry again and filtration was conduction twice to collect coarse particles. And then, these coarse particles were sufficiently dried and were measured. The concentration of coarse particles was evaluated from the weight of these coarse particles.

Second to Sixth Embodiments and Comparative Examples 1 and 2:

Immersion heating pulverization was carried out through varying the water temperature in the agitating apparatus at the time of charging the raw material and the immersion duration after charging the raw material. The other conditions for manufacturing an abrasive were the same as the case of First Embodiment, and so the descriptions are omitted.

Comparative Example 3:

The raw material was pulverized only through wet pulverization by means of an attriter in the step of pulverizing the raw material and roasted without carrying out immersion heating pulverization through an agitating apparatus. More specifically, first, the raw material was mixed with pure water to prepare slurry (the content of solid component of 33.3% by weight), and the slurry thus obtained was charged into an attriter and then pulverization was completed only by carrying out wet pulverization for 10 hours. The other conditions for manufacturing an abrasive were the same as the case of Second Embodiment.

permits a raw material to be pulverized in a shorter time. In addition, it has also been found out that the concentration of coarse particles in an abrasive product finally obtained is restrained compared with the case of Comparative Example 3, and that immersion heating pulverization has the effect of lowering the concentration of coarse particles in an abrasive.

Comparative Example 1 carried out immersion heating pulverization, with the temperature of the slurry kept at 40° C. or higher (45° C. or lower); the concentration of coarse particles in the raw material obtained after immersion heating pulverization was high. On the other hand, First Embodiment, in which the concentration of coarse particles was low, carried out immersion heating pulverization, with the temperature of the slurry kept at 60° C. or higher (65° C. or lower). This result has shown that for immersion heating pulverization the temperature of the slurry was preferably kept at 60° C. or higher. On the other hand, as for the upper limit of the keeping temperature of slurry, since Fourth Embodiment, in which the slurry kept at 95° C. or higher and 100° C. or lower was subjected to immersion heating pulverization, gave a good pulverization result, it has been shown that if the keeping temperature of slurry during immersion heating pulverization is at least at 100° C. or

TABLE 1

| Embodiment/ Comparative Example | Immersion heating pulverization | | Concentration of coarse particles (ppm by weight) | | |
|---|---|---|---|---|---|
| | Heating temperature (° C.) | Immersion duration (min) | Raw material after immersion heating | Raw material after pulverization through attriter | Abrasive |
| Comparative Example 1 | 40 | 5 | 30000 | 1200 | 3300 |
| First Embodiment | 60 | 5 | 250 | 100 | 430 |
| Second Embodiment | 80 | 5 | 200 | 80 | 270 |
| Third Embodiment | 95 | 1 | 330 | 140 | 470 |
| Fourth Embodiment | 95 | 5 | 150 | 60 | 200 |
| Fifth Embodiment | 80 | 20 | 100 | 40 | 150 |
| Sixth Embodiment | 80 | 60 | 70 | 20 | 80 |
| Comparative Example 2 | 80 | 180 | 20 | <10 | <10 |
| Comparative Example 3 | — | — | — | 200 | 500 |

Common data for the first raw material:
LOI=30% by weight
TREO/raw material=69% by weight
$CeO_2$/REO=60% by weight In Comparative Example 3, the raw material was pulverized only through pulverization by means of an attriter without carrying out immersion heating pulverization; it took 10 hours to make the concentration of the coarse particles of the raw material after pulverization reach the value indicated in the table. On the other hand, in First Embodiment and Second Embodiment, the raw material was subjected to immersion heating pulverization for 5 minutes, followed by pulverization by means of an attriter for 1 hour, and after the pulverization, a raw material with a lower concentration of coarse particles was obtained. As a result, it has been found out that immersion heating pulverization lower, good pulverization that gives a low concentration of coarse particles can be carried out and the concentration of coarse particles in the abrasive product is lowered as well.

In addition, the results of the Third Embodiment have shown that if immersion duration is 1 minute or longer, only immersion heating pulverization can lower the concentration of coarse particles to a level that is comparable to the case where only pulverization by means of an attriter was carried out for 10 hours (Comparative Example 3). Further, the concentration of coarse particles in the abrasive product finally obtained was low as well. On the other hand, as for the upper limit of immersion duration the results of Sixth Embodiment and Comparative Example 2 have shown that as immersion duration is elongated, the concentration of coarse particles can be decreased.

Seventh Embodiment:

In this Embodiment, the raw material was pulverized only through immersion heating pulverization using an agitating apparatus without carrying out wet pulverization by means of an attriter. In the immersion heating pulverization, the slurry in the container was heated so as to maintain the temperature of the slurry in the agitating apparatus at 95° C. or higher (100° C. or lower). In addition, the immersion duration was 20 minutes. The other abrasive-manufacturing conditions were the same as those in Second Embodiment.

Eighth Embodiment:

In the step of pulverizing the raw material of this Embodiment, at first, the raw material was mixed with pure water to prepare slurry (the content of solid component of 33.3% by weight) and then the slurry thus prepared was wet pulverized in an attriter. After this wet pulverization, the raw material was charged into an agitating apparatus to carry out immersion heating pulverization. Except the abrasive-manufacturing condition of firstly carrying out pulverization by means of an attriter and then carrying out immersion heating pulverization, the other conditions were the same as the case of Second Embodiment, including the keeping temperature for the slurry and the immersion duration.

As has already been described, the concentration of coarse particles can be decreased through immersion heating pulverization. Seventh Embodiment has confirmed that roasting after immersion heating pulverization without actually carrying out pulverization by means of an apparatus such as an attriter can also provide an abrasive product with coarse particles in low concentration. In addition, Eighth Embodiment has shown that a combination of immersion heating pulverization and pulverization by means of an attriter can also give a good pulverization result with coarse particles in low concentration even though either of the pulverizing methods is carried out first.

Ninth to Eleventh Embodiments and Comparative Example 4:

Five kilograms of the raw material prepared through calcining the raw material used in First Embodiment (rare earth carbonate) under specified calcining conditions and by adjusting the LOI was charged into 10 kg of pure water heated in the container of an agitating apparatus and then the immersion heating pulverization was carried out. Table 3 gives calcining conditions for each Embodiment and a Comparative Example. The other abrasive-manufacturing conditions were the same as the case of Second Embodiment.

TABLE 2

| | | | Concentration of coarse particles (ppm by weight) | | | |
|---|---|---|---|---|---|---|
| | Immersion heating pulverization | | Raw material after firstly carrying out pulverization by means of attriter | Raw material after immersion heating | Raw material after pulverization by means of attriter | Abrasive |
| Embodiment/ Comparative Example | Heating temperature (° C.) | Immersion duration (min) | | | | |
| Second Embodiment | 80 | 5 | — | 200 | 80 | 270 |
| Fourth Embodiment | 95 | 5 | — | 150 | 60 | 200 |
| Seventh Embodiment | 95 | 20 | — | 120 | — | 450 |
| Eighth Embodiment | 80 | 5 | 5000 | 75 | — | 220 |

Common data for the first raw material:
  LOI=30% by weight
  TREO/raw material=69% by weight
  $CeO_2$/TREO=60% by weight

TABLE 3

| | | | | | | Concentration of coarse particles (ppm by weight) | | |
|---|---|---|---|---|---|---|---|---|
| | Calcination | | | Immersion heating pulverization | | Raw material after immersion heating | Raw material after pulverization by means of attriter | Abrasive |
| Embodiment/ Comparative Example | Temperature (° C.) | Duration (h) | LOI (% by weight) | Heating temperature (° C.) | Immersion duration (min) | | | |
| Second Embodiment | — | — | 30 | 80 | 5 | 200 | 80 | 270 |
| Ninth Embodiment | 400 | 2 | 10 | 80 | 5 | 240 | 100 | 380 |
| Tenth Embodiment | 500 | 2 | 5 | 80 | 5 | 290 | 120 | 430 |
| Eleventh Embodiment | 850 | 5 | 1.0 | 80 | 5 | 350 | 150 | 500 |

TABLE 3-continued

| | Calcination | | | Immersion heating pulverization | | Concentration of coarse particles (ppm by weight) | | |
|---|---|---|---|---|---|---|---|---|
| Embodiment/ Comparative Example | Temperature (° C.) | Duration (h) | LOI (% by weight) | Heating temperature (° C.) | Immersion duration (min) | Raw material after immersion heating | Raw material after pulverization by means of attriter | Abrasive |
| Comparative Example 4 | 950 | 5 | 0.5 | 80 | 5 | 12000 | 700 | 1800 |

In Comparative Example 4, in which the LOI was 0.5% by weight, the concentration of coarse particles in the raw material after immersion heating pulverization was extremely high. On the other hand, each Embodiment, in which the LOI was 1.0% by weight or more (40% by weight or less), has shown that the concentrations of coarse particles in the raw material and an abrasive product after immersion heating pulverization are kept low. These results have proved that immersion heating pulverization is a particularly effective method of pulverization, such as being able to reduce the concentration of coarse particles and also decrease the pulverizing duration, when a raw material for a cerium-based abrasive is a cerium-based rare earth carbonate or a material containing both a cerium-based rare earth carbonate and a cerium-based rare earth oxide.

Twelfth and Thirteenth Embodiments and Comparative Example 5:

The raw material obtained through carrying out immersion heating pulverization and then carrying out wet pulverization by means of an attriter was subjected to fluorination, followed by roasting. The other abrasive-manufacturing conditions were the same as the case of Second Embodiment. In addition, fluorination was carried out by the addition of a hydrogen fluoride (HF) aqueous solution to slurry. Other solutions, e.g. ammonium fluoride can be used for the addition to the slurry. The concentrations of the fluorine component in raw materials obtained through fluorination are given in Table 4.

Common data for the first raw material:
  LOI=30% by weight
  TREO/raw material=69% by weight
  $CeO_2$/TREO=60% by weight The table shows that good pulverized materials with coarse particles in lowered concentration are obtained even when fluorination was carried out after pulverization. However, the comparison with Second Embodiment indicates that raw materials and abrasive products after immersion heating pulverization are not so different in the concentration of coarse particles.

Polishing Test:

A cerium-based abrasive in the form of slurry, obtained in each Embodiment or Comparative Example, was subjected to polishing test to thereby measure the polishing value and evaluate the state of the polished face (evaluate scratches). In the polishing test, a piece of glass of 65 mm$\phi$ for a flat panel as a material to be polished was polished under a high speed polishing test apparatus using a polishing pad of polyurethane. In the polishing test, an abrasive obtained was further dispersed in water to prepare abrasive slurry of a concentration of 10% by weight. The polishing conditions were as follows: the abrasive slurry obtained was fed at a speed of 5 L/min, the pressure on a face to be polished was set to be 1.54 MPa (15.7 kg/cm$^2$) and the rotational speed of the polishing apparatus was set to be 1,000 rpm. A glass material after polishing was cleaned with pure water and dried under dust-free conditions.

TABLE 4

| | Immersion heating pulverization | | Concentration of fluorine component of raw material | Concentration of coarse particles (ppm by weight) | | |
|---|---|---|---|---|---|---|
| Embodiment/ Comparative Example | Heating temperature (° C.) | Immersion duration (min) | after fluorination (wt %) | Raw material after immersion heating | Raw material after pulverization by means of attriter | Abrasive |
| Second Embodiment | 80 | 5 | <0.1 | 240 | 100 | 380 |
| Twelfth Embodiment | 80 | 5 | 1.0 | 200 | 80 | 270 |
| Thirteenth Embodiment | 80 | 5 | 3.0 | 200 | 80 | 250 |
| Comparative Example 5 | 80 | 5 | 6.0 | 200 | 80 | 200 |

Evaluation of Polishing Value:

In the aforementioned polishing test, the polishing value was obtained on the basis of the difference of the glass weights through measuring the glass weights before and after polishing. In this case, the polishing value of the case where the abrasive in Comparative Example 1 was used for polishing was set to be a reference (100).

Evaluation of Scratches:

This refers to the evaluation of the state of a polished face. The evaluation of scratches was conducted based on the presence or absence of scratches on a polished face. More specifically, light of a halogen lamp with a 300,000-lux light source was irradiated to the surface of glass after polishing. The surface of the glass was observed through the reflection method and the extent of scratches (size and number) was judged and rated, and evaluated by deducting points from one hundred.

Evaluation of Cleanability:

The cleanability test of abrasives was carried out through cleaning faces polished with the use of cerium-based abrasives obtained in each Embodiment and each Comparative Example. A glass plate for optical microscopic observation was subjected to ultrasonic cleaning and drying for the test. A cerium-based abrasive was dispersed in water to obtain abrasive slurry of a concentration of 10% by weight. The plate was immersed in this abrasive slurry, then removed and sufficiently dried in a dryer to obtain a specimen for cleanability test with the abrasive stuck to the surface of the plate. Further, the plate was dried at a temperature of 50° C. Then, the specimen thus obtained was immersed in pure water in a beaker and was subjected to ultrasonic cleaning for 5 minutes. After cleaning, the plate was taken out of the beaker and then was put in pure water for flowing water cleaning. The surface of the plate after flowing water cleaning was observed under an optical microscope to evaluate the amount of the residue of the abrasive particles remaining on the surface. The evaluation results are shown in Table 5.

TABLE 5

| Embodiment/ Comparative Example | LOI of raw material (% by weight) | Immersion heating pulverization Heating temperature (° C.) | Immersion duration (min) | Average particle diameter (μm) | Concentration of coarse particles (ppm by weight) | Fluorine concentration (% by weight) | Polishing value | Scratches | *Cleanability |
|---|---|---|---|---|---|---|---|---|---|
| Comparative Example 1 | 30 | 40 | 5 | 1.0 | 3300 | 0.03 | 100 | 35 | F |
| First Embodiment | 30 | 60 | 5 | 1.0 | 430 | 0.02 | 137 | 91 | E |
| Second Embodiment | 30 | 80 | 5 | 1.0 | 270 | 0.02 | 129 | 96 | E |
| Third Embodiment | 30 | 95 | 1 | 1.1 | 470 | 0.02 | 140 | 90 | E |
| Fourth Embodiment | 30 | 95 | 5 | 0.9 | 200 | 0.01 | 122 | 98 | E |
| Fifth Embodiment | 30 | 80 | 20 | 0.9 | 150 | 0.02 | 117 | 98 | E |
| Sixth Embodiment | 30 | 80 | 60 | 0.9 | 80 | 0.01 | 111 | 99 | E |
| Comparative Example 2 | 30 | 80 | 180 | 0.8 | <10 | 0.01 | 71 | 95 | P |
| Comparative Example 3 | 30 | — | — | 1.0 | 500 | 0.03 | 70 | 96 | P |
| Seventh Embodiment | 30 | 95 | 20 | 1.0 | 450 | 0.01 | 122 | 90 | E |
| Eighth Embodiment | 30 | 80 | 5 | 1.0 | 220 | 0.02 | 130 | 96 | E |
| Ninth Embodiment | 10 | 80 | 5 | 1.0 | 380 | 0.02 | 135 | 94 | E |
| Tenth Embodiment | 5 | 80 | 5 | 1.0 | 430 | 0.01 | 139 | 93 | E |
| Eleventh Embodiment | 1.0 | 80 | 5 | 1.0 | 500 | <0.01 | 145 | 90 | G |
| Comparative Example 4 | 0.5 | 80 | 5 | 1.3 | 1800 | <0.01 | 150 | 73 | F |
| Twelfth Embodiment | 30 | 80 | 5 | 1.2 | 270 | 0.90 | 152 | 93 | E |
| Thirteenth Embodiment | 30 | 80 | 5 | 1.2 | 250 | 2.60 | 172 | 90 | G |
| Comparative Example 5 | 30 | 80 | 5 | 1.5 | 200 | 5.30 | 195 | 85 | P |

*Cleanability evaluation
E: Excellent A stuck abrasive was not observed.
G: Good Only trace amount of a stuck abrasive was observed.
F: Fair A small amount of a stuck abrasive was observed.
P: Poor A large amount of a stuck abrasive was observed.

The polishing test results of the abrasives in Comparative Example 1 and First to Sixth Embodiments show that abrasives with coarse particles in low concentration exhibit high evaluations and that the conditions for suitably carrying out immersion heating pulverization are basically equivalent to those for obtaining an abrasive excellent in each performance. However, although the abrasive of Comparative Example 2 (immersion duration is 180 minutes) is extremely low in the concentration of coarse particles, the polishing value and cleanability are relatively inferior. These results show that if the immersion duration during immersion heating pulverization is made too long, the concentration of coarse particles is decreased; however, the polishing value and cleanability of the abrasive product are lowered. In other words, it is shown that in order to obtain an abrasive excellent in all the evaluations, in addition to the conditions of immersion heating pulverization described previously, the immersion duration is preferably 90 minutes or shorter, and that from the results of Sixth Embodiment, the immersion duration is preferably 60 minutes or shorter. Thus, when the immersion duration is likely to exceed 60 minutes, particularly 90 minutes, the slurry is preferably once cooled to below 60° C. or lower (preferably ambient temperature). In summary, the keeping temperature of slurry is preferably in a range of 60° C. to 100° C. and the immersion duration is 1 minute to 90 minutes, particularly preferably 1 minute to 60 minutes.

The test results of the abrasive in Seventh Embodiment are all good. This Embodiment did not carry out pulverization by means of an attriter. Hence, pulverization of a raw material only through immersion heating pulverization is found to give an excellent abrasive.

In addition, the test results of the abrasive in Eighth Embodiment are good in all the attributes. In this Embodiment, pulverization by means of an attriter was conducted first, and then immersion heating pulverization was carried out. Therefore, also referring to the results of Second Embodiment, in which immersion heating pulverization was carried out first, either immersion heating pulverization or pulverization by means of an attriter can be carried out first.

Referring to the polishing test results of the abrasives of Ninth to Eleventh Embodiments and Comparative Example 4, the concentration of coarse particles of a raw material obtained through pulverization is high when the LOI of a raw material is low, and the scratch evaluation of an abrasive finally obtained is also low (Comparative Example 4). Further, the concentration of coarse particles of a raw material obtained through pulverization is low when the LOI of a raw material is high, and the evaluations of an abrasive finally obtained is also high. As a result, when a raw material is pulverized through immersion heating pulverization, a raw material is preferably a cerium-based rare earth carbonate or a material containing both a cerium-based rare earth carbonate and a cerium-based rare earth oxide. Thus, such a raw material can be pulverized into a good form in a short time, which can lead to the production of an abrasive excellent in each performance.

For the abrasives of Twelfth and Thirteenth Embodiments and Comparative Example 5, in which fluorination is carried out prior to roasting after pulverization, the concentrations of the coarse particles of a raw material and an abrasive product after immersion heating pulverization are comparable to that of Second Embodiment. However, the abrasive of Comparative Example 5, in which the amount of fluorine component added by fluorination is the largest, is inferior in the evaluations of scratches and cleanability. As a result, fluorination is allowable; however, in this case, a large amount of fluorine component should not preferably be added. More specifically, the table shows that the concentration of the fluorine component of an abrasive is preferably lower than 3.0% by weight, more preferably 1.0% by weight or less.

INDUSTRIAL APPLICABILITY

The present invention can provide a method of manufacturing a cerium-based abrasive having coarse particles in lower concentration, a higher polishing ability and also being excellent in cleanability for a polished face. In addition, use of the present invention makes it possible to effectively pulverize a raw material in a short time so as to reliably decrease the concentration of coarse particles and to effectively produce a cerium-based abrasive having an excellent polishing ability.

What is claimed is:

1. A method of manufacturing a cerium-based abrasive comprising the steps of: pulverizing a raw material of a serium-based abrasive; roasting a raw material after pulverization; and disintegrating a raw material after roasting, wherein a cerium-based rare earth carbonate or a mixture of a cerium-based rare earth carbonate and a cerium-based rare earth oxide is used as a cerium-based abrasive raw material, and the step of pulverizing a raw material comprises a step of pulverization through heating a raw material kept immersed in aqueous solution.

2. The method of manufacturing a cerium-based abrasive according to claim 1, wherein in the step of pulverization through heating a raw material kept immersed in aqueous solution, the heating temperature of the aqueous solution is 60° C. to 100° C.

3. The method of manufacturing a cerium-based abrasive according to claim 1, wherein the loss on ignition for a cerium-based abrasive raw material is 1.0% by weight to 40% by weight when the raw material is heated at 1,000° C. for 1 hour.

4. A cerium-based abrasive produced by the method of manufacturing a cerium-based abrasive according to claim 1, wherein the concentration of a fluorine component is 3.0% by weight or less.

5. A cerium-based abrasive according to claim 4, wherein the concentration of a fluorine component is 0.01% by weight to 1.0% by weight.

* * * * *